United States Patent
Kurosawa et al.

(10) Patent No.: US 9,677,507 B2
(45) Date of Patent: Jun. 13, 2017

(54) OIL SEPARATOR

(71) Applicants: TOKYO ROKI CO., LTD., Yokohama-shi, Kanagawa (JP); NIKKI CO., LTD, Atsugi-shi, Kanagawa (JP)

(72) Inventors: Takatsugu Kurosawa, Yokohama (JP); Tadashi Ichikawa, Yokohama (JP); Yoshinori Maehira, Yokohama (JP); Takayuki Idehara, Yokohama (JP); Tomoaki Fukuoka, Atsugi (JP); Masashi Iwasaki, Atsugi (JP); Koji Kawayoko, Atsugi (JP); Takaya Kohara, Atsugi (JP)

(73) Assignees: Tokyo Roki Co., Ltd., Yokohama-shi, Kanagawa (JP); Nikki Co., Ltd., Atsugi-shi, Kanagawa (JP)

( * ) Notice: Subject to any disclaimer, the term of this patent is extended or adjusted under 35 U.S.C. 154(b) by 0 days.

(21) Appl. No.: 14/423,368

(22) PCT Filed: Dec. 19, 2012

(86) PCT No.: PCT/JP2012/082936
§ 371 (c)(1),
(2) Date: Feb. 23, 2015

(87) PCT Pub. No.: WO2014/033970
PCT Pub. Date: Mar. 6, 2014

(65) Prior Publication Data
US 2015/0226158 A1   Aug. 13, 2015

(30) Foreign Application Priority Data
Aug. 31, 2012   (JP) ................... 2012-192344

(51) Int. Cl.
*F02M 21/02* (2006.01)
*B01D 46/24* (2006.01)
(Continued)

(52) U.S. Cl.
CPC ....... *F02M 21/0227* (2013.01); *B01D 46/003* (2013.01); *B01D 46/0024* (2013.01);
(Continued)

(58) Field of Classification Search
CPC .......................... B01D 46/0024; B01D 46/003
(Continued)

(56) References Cited

U.S. PATENT DOCUMENTS 2,400,347 A    5/1946  Goodloe
2,521,785 A *  9/1950  Goodloe ............ B01D 46/0023
                                                       55/482
(Continued)

FOREIGN PATENT DOCUMENTS

DE     2931702 A1    2/1981
DE     3729955 A1    3/1988
(Continued)

OTHER PUBLICATIONS

International Search Report and Written Opinion of the ISA for PCT/JP2012/082936, ISA/JP, mailed Feb. 19, 2013.
(Continued)

*Primary Examiner* — Amber R Orlando
*Assistant Examiner* — Britanny Precht
(74) *Attorney, Agent, or Firm* — Harness, Dickey & Pierce P.L.C.

(57) ABSTRACT

A purpose of the present invention is to improve the oil removal rate in an oil separator that separates and removes oil from gas including the oil as an impurity. The oil separator according to the present invention is characterized by including a first filter member (42) in a cylindrical shape made with a cylindrical filter material having an air permeability, and positioned such that the target gas flows in from a hollow part as well as a central axis is in an up-down direction, and a second filter member (43) made with a filter
(Continued)

material having air permeability and wrapped around the first filter member (42) along an outer surface thereof with a predetermined spacing from the outer surface of the first filter member (42).

5 Claims, 8 Drawing Sheets (51) Int. Cl.
B01D 46/00 (2006.01)
F02M 21/06 (2006.01)
F01M 13/04 (2006.01)

(52) U.S. Cl.
CPC ..... *B01D 46/2411* (2013.01); *F02M 21/0212* (2013.01); *F01M 2013/0438* (2013.01); *F02M 21/06* (2013.01); *Y02T 10/32* (2013.01)

(58) Field of Classification Search
USPC ..... 55/319, 482, 423, 292; 95/242, 176, 179
See application file for complete search history.

(56) References Cited

U.S. PATENT DOCUMENTS

| | | | | |
|---|---|---|---|---|
| 3,161,593 A | * | 12/1964 | Schiel | 494/37 |
| 3,722,184 A | * | 3/1973 | McMinn | E21B 43/34 |
| | | | | 196/155 |
| 4,189,310 A | * | 2/1980 | Hotta | B01D 50/00 |
| | | | | 55/317 |
| 4,210,001 A | * | 7/1980 | Miller, Sr. | F25B 40/04 |
| | | | | 62/468 |
| 4,231,768 A | * | 11/1980 | Seibert | A61L 9/00 |
| | | | | 210/DIG. 5 |
| 4,331,460 A | | 5/1982 | Dillmann et al. | |
| 4,761,166 A | * | 8/1988 | Kitchener | F04C 29/026 |
| | | | | 55/385.1 |
| 4,838,905 A | | 6/1989 | Billiet et al. | |
| 8,741,015 B2 | | 6/2014 | Schnacke | |
| 2005/0235617 A1 | * | 10/2005 | Read | 55/423 |
| 2012/0144789 A1 | * | 6/2012 | Schnacke | B01D 46/0024 |
| | | | | 55/482 |

FOREIGN PATENT DOCUMENTS

| | | |
|---|---|---|
| DE | 102009031420 A1 | 1/2011 |
| GB | 2194902 A | 3/1988 |
| JP | S50-101070 U | 8/1975 |
| JP | S53-92973 A | 8/1978 |
| JP | S61-10737 Y2 | 4/1986 |
| JP | 63-72318 A | 4/1988 |
| JP | H4-37519 U | 3/1992 |
| JP | H6-32166 Y | 8/1994 |
| JP | 07-328364 | 12/1995 |
| JP | H08-281032 A | 10/1996 |
| JP | 2012-531305 A | 12/2012 |
| WO | WO-2011/000720 A1 | 1/2011 |

OTHER PUBLICATIONS

First Notice of Opinion on Examination, Chinese Patent Application No. 201280075305.8, Oct. 9, 2015.
Notification of Reasons for Refusal, Japanese Patent Application No. 2012-192344, Jul. 5, 2016.
Second Office Action, Chinese Patent Application No. 201280075305.8, May 10, 2016.
Office Action in counterpart Chinese application CN 201280075305.8, with English translation thereof.
Office Action in counterpart Japanese application JP 2012-192344, with English translation thereof.

* cited by examiner

OIL SEPARATOR

CROSS-REFERENCE TO RELATED APPLICATIONS

This application is a 371 U.S. National Stage of International Application No. PCT/JP2012/082936, filed Dec. 19, 2012, which claims priority to Japanese Patent Application No. 2012-192344, filed Aug. 31, 2012. The entire disclosures of the above applications are incorporated herein by reference.

TECHNICAL FIELD

The present invention relates to an oil separator that separates oil from gas including the oil as an impurity.

BACKGROUND ART

A separator that separates impurities from gas including the impurities is known. For example, the device disclosed in PTL 1 is provided with a separation chamber between a primary side port into which gas before treatment flows and a secondary side port from which gas after treatment is discharged. A filter element manufactured by shaping nonwoven resin fabric into a cylindrical form is arranged in the separation chamber to introduce gas before treatment into the hollow part of the filter element. Then liquid such as moisture included in the gas before treatment is captured by the filter element and separated from the gas, and thus gas after treatment that has flowed out from the outer surface of the filter element is guided to the secondary side port.

CITATION LIST

Patent Literature

[PTL 1] Japanese Patent Application Laid-open Publication No. 7-328364

SUMMARY OF INVENTION

Technical Problem

Not only moisture with low viscosity but oil with high viscosity such as tar is included in gas as an impurity. There has been a problem that, when an attempt to separate oil with high viscosity is made using the aforementioned device, this oil would bulge at the outer surface of the filter element in a foamed state, and the mist generated by the ruptured foam would flow out to the secondary side along with the gas flow.

The present invention has been made in view of such circumstances, and an objective thereof is to improve the oil removal rate when separating and removing oil from gas including the oil as an impurity.

Solution to Problem

One aspect of the present invention to achieve the foregoing objective is an oil separator that separates oil from a target gas including the oil as an impurity, the oil separator comprising a first filter member made with a cylindrical filter material in a cylindrical shape having an air permeability, and arranged such that the target gas flows in from a hollow part and a central axis is in an up-down direction, and a second filter member made with a filter material having an air permeability, and wrapped around the first filter member along an outer surface thereof with a predetermined spacing from the outer surface of the first filter member.

The oil separator according to the present invention can capture oil in a mist form with the second filter member even when the foam of the oil at the outer surface of the first filter member ruptures and scatters in a mist form. Since the oil is removed by the second filter member in such a manner, the removal rate of the oil included in the target gas can be improved.

In the aforementioned oil separator it is preferable that the predetermined spacing is set wider than a maximum height of a foam of the oil formed on the outer surface of the first filter member by a flow of the target gas. With this configuration, the foam of the oil generated on the outer surface of the first filter member can be made to rupture before coming into contact with the second filter member.

In the aforementioned oil separator it is preferable that the second filter member is made with a thin filter material having a mesh size larger than that of the first filter member. With this configuration, the oil mist can be captured while air permeability is secured. Further, the oil separator can be miniaturized since the second filter member is made with a thin filter material.

In the aforementioned oil separator it is preferable that the second filter member is made of a nonwoven fabric. With this configuration, a filter material with air permeability can be made easily.

In the aforementioned oil separator it is preferable that the first filter member is manufactured by wrapping a nonwoven fabric around a support tube a plurality of times. With this configuration, the size of the mesh of the first filter member and the capacity of retained oil can be adjusted easily.

In the aforementioned oil separator it is preferable that an upper blocking member blocks a space between the outer surface of the first filter member and an inner surface of the second filter member at top parts of the filter members, and a lower blocking member blocks the space at bottom parts of the filter members and is provided with a discharge hole for discharging the oil that has flowed down the space. With this configuration, the two ends at the top and bottom of the space between the first filter member and the second filter member are blocked by the upper blocking member and the lower blocking member so that much of the target gas that has passed through the first filter member can be guided to the second filter member. More mist-like oil can be captured with the second filter member with the above configuration thus improving the removal rate of the oil included in the target gas.

Advantageous Effects of Invention

According to the present invention, the oil removal rate can be improved in an oil separator that separates and removes oil from gas including the oil as an impurity.

DESCRIPTION OF EMBODIMENTS

The following describes the embodiments of the present invention. A first embodiment in which an oil separator according to the present invention is applied to a gas fuel supply device is explained first.

Figure 1:
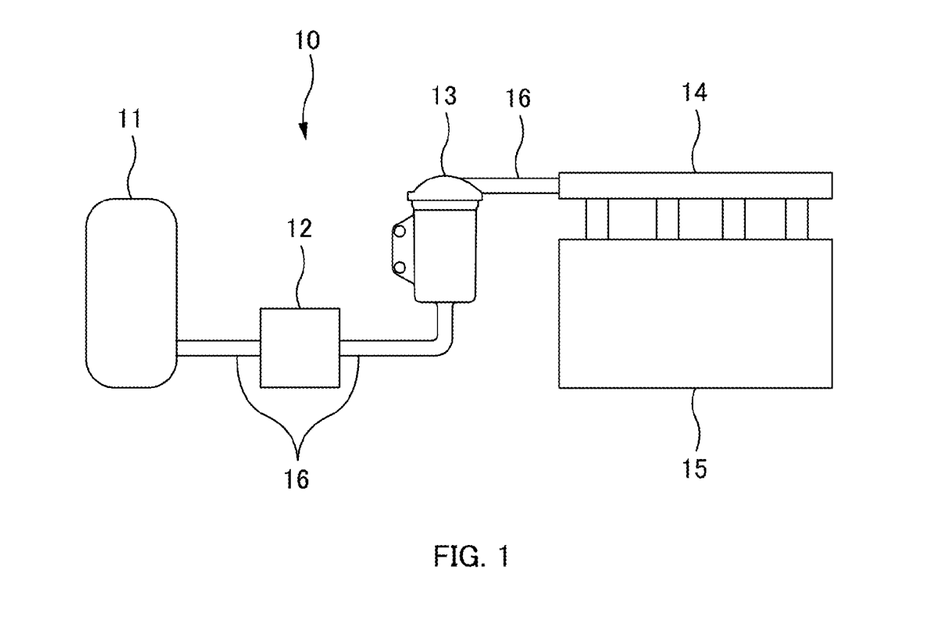
FIG. 1 is a diagram illustrating a first embodiment in which an oil separator of the present invention has been applied to a gas fuel supply device.

The gas fuel supply device 10 illustrated in FIG. 1 includes a fuel tank 11, a vaporizer 12, a fuel filter 13, an injector 14, and a gas engine 15.

The fuel tank 11 is a container that stores liquid fuel before gasification and is configured with, for example, a metal pressure resistant container. Liquefied petroleum gas (LPG) is used as the liquid fuel in the present embodiment. The liquid fuel stored in the fuel tank 11 is fed through piping 16 to the vaporizer 12.

The vaporizer 12 is a device that vaporizes liquid fuel into fuel gas. The vaporizer 12 can be of various types as long as liquid fuel can be vaporized. The liquid gas vaporized by the vaporizer 12 is fed through the piping 16 to the fuel filter 13.

The fuel filter 13 is a part that separates and removes, from fuel gas, impurities included in the fuel gas that has been vaporized by the vaporizer 12. In other words, plasticizers and heavy fraction that become tars by vaporization are included as impurities in the liquid fuel such as LPG. There is a possibility of unstable supply of fuel gas and clogging of the injector 14 being caused when the impurities are supplied to the injector 14. For such reason, the fuel filter 13 is arranged between the vaporizer 12 and the injector 14 to supply, to the injector 14, the fuel gas from which impurities have been separated.

This fuel filter 13 corresponds to an oil separator that separates and removes oil as an impurity from the fuel gas which is the target gas. Note that description of the fuel filter 13 will be given later in detail.

The injector 14 is a device that mixes fuel gas with air and injects the mixture to the gas engine 15. For example, the injector 14 optimizes the air-fuel gas mixing ratio according to the target rotational frequency of the gas engine 15 for feeding the mixture to the gas engine 15. The gas engine 15 is a part that acquires power by combustion of the mixed gas fed from the injector 14. For example, the gas engine 15 reciprocates the piston by combustion of the mixed gas inside the cylinder. Rotational force is acquired from the shaft that is rotated along with the reciprocation of the piston.

Figure 3:
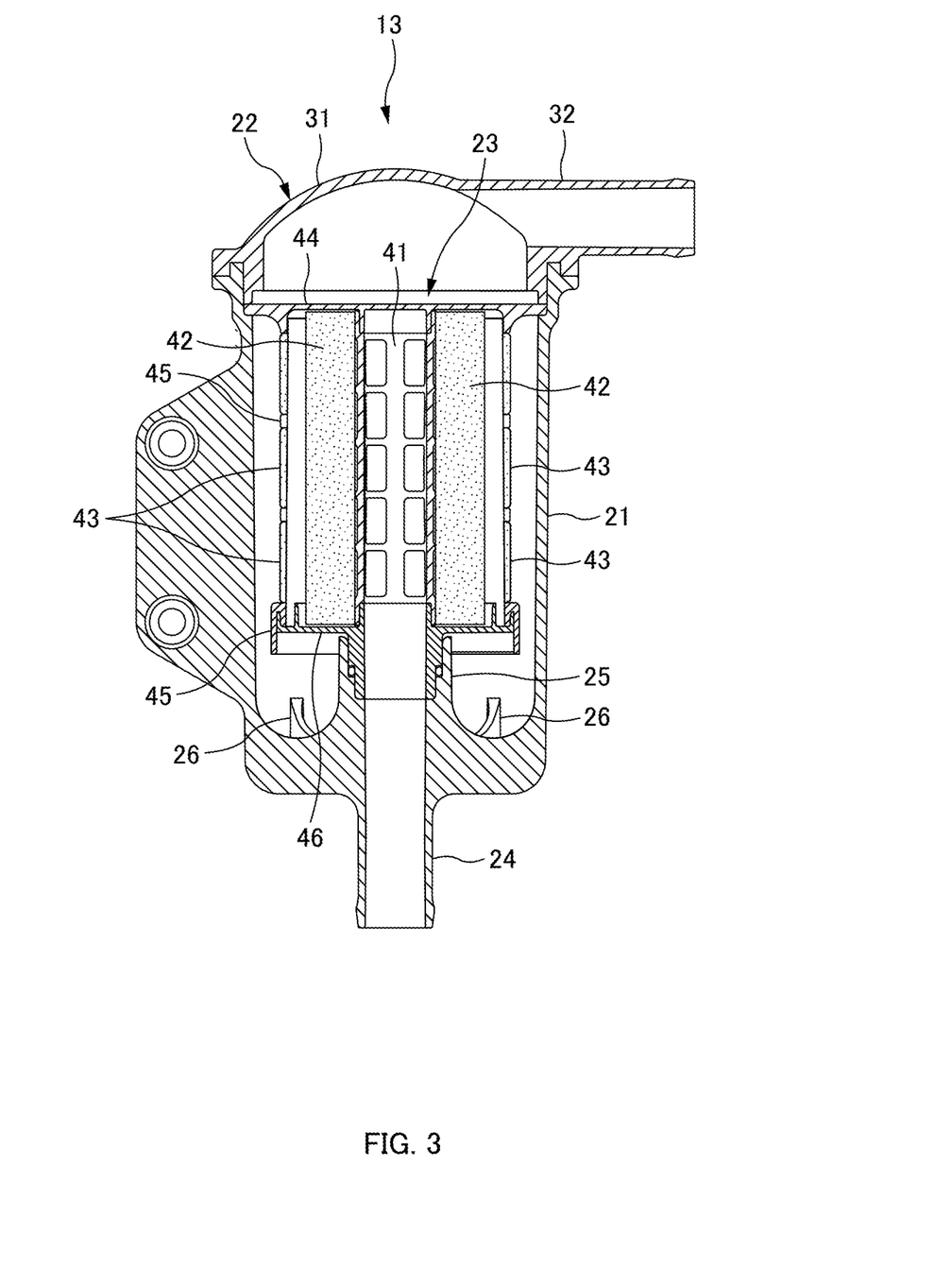
FIG. 3 is a sectional view taken along line A-A of FIG. 2.

Next, a detailed description of the fuel filter 13 will be given. As illustrated in FIG. 3, the fuel filter 13 includes a case 21, a cap member 22, and a filter unit 23.

The case 21 is a member that forms, with the cap member 22, an accommodation space of the filter unit 23. The case 21 of the present embodiment is made with a cylindrical member with an open top and a closed bottom. This case 21 is made by molding resin. The center of the bottom face of the case 21 is provided with a fuel gas inflow port 24. This inflow port 24 is a cylindrical part provided facing downward and is connected to the piping 16 for communication between the vaporizer 12 and the fuel filter 13.

The lower part at the inner side of the case 21 is provided with a seat part 25 to which the lower end part of the filter unit 23 is mounted. In other words, a recess into which the lower end part of the filter unit 23 fits is formed at the upper part of the seat part 25. The seat part 25 is made in a hollow shape, and the interior space of the seat part 25 and the interior space of the inflow port 24 are formed in series. These interior spaces configure the inflow channel for the fuel gas.

Additionally, partitioning walls 26 are radially formed about the seat part 25 at the lower part inside the case 21. These partitioning walls 26 partition the reservoir space in which oil that drips from the filter unit 23 is stored. Eight partitioning walls 26 at an angular interval of 45 degrees in the circumferential direction are provided in the present embodiment.

Figure 2:
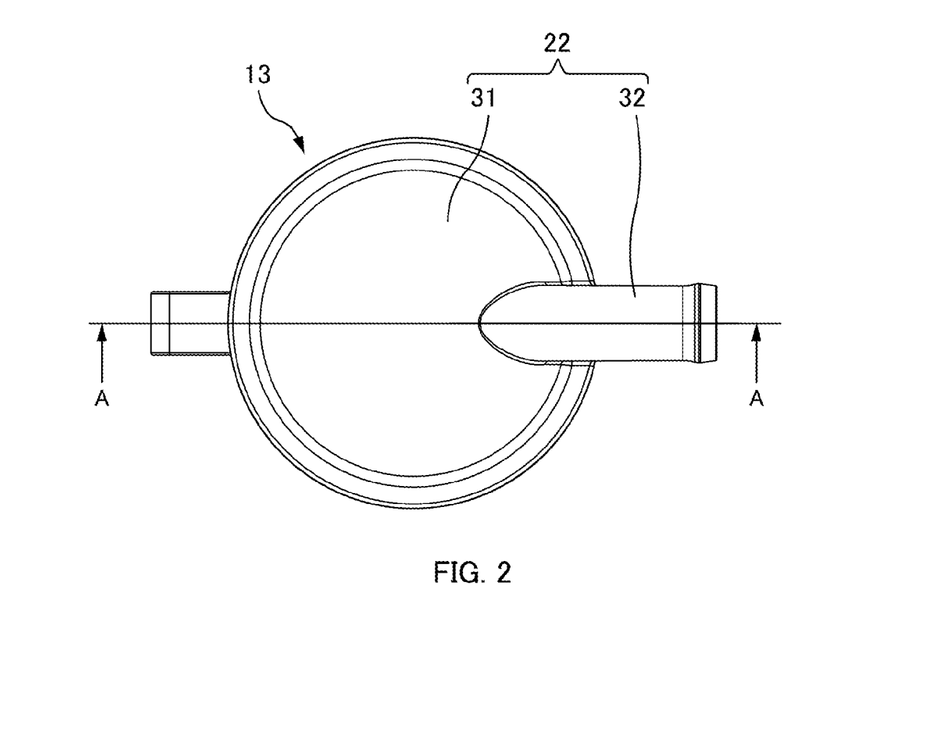
FIG. 2 is a planar view of a fuel filter according to the first embodiment.

As illustrated in FIGS. 2 and 3, the cap member 22 is a member that covers the top of the case 21 and has a main body part 31 bulging in a hemispherical shape and a cylindrical discharge port 32 provided facing the side direction (radially) from the main body part 31. The case 21 and the cap member 22 (main body part 31) are connected by vibration welding. Note that the case 21 and the cap member 22 may be connected using a thread groove or an adhesive. Further, the discharge port 32 is connected to the piping 16 for communication between the fuel filter 13 and the injector 14.

The filter unit 23 is a part that removes the tar (oil) included in the fuel gas and is accommodated in the accommodation space sectioned from the exterior by the case 21 and the cap member 22, as illustrated in FIG. 3.

Figure 4:
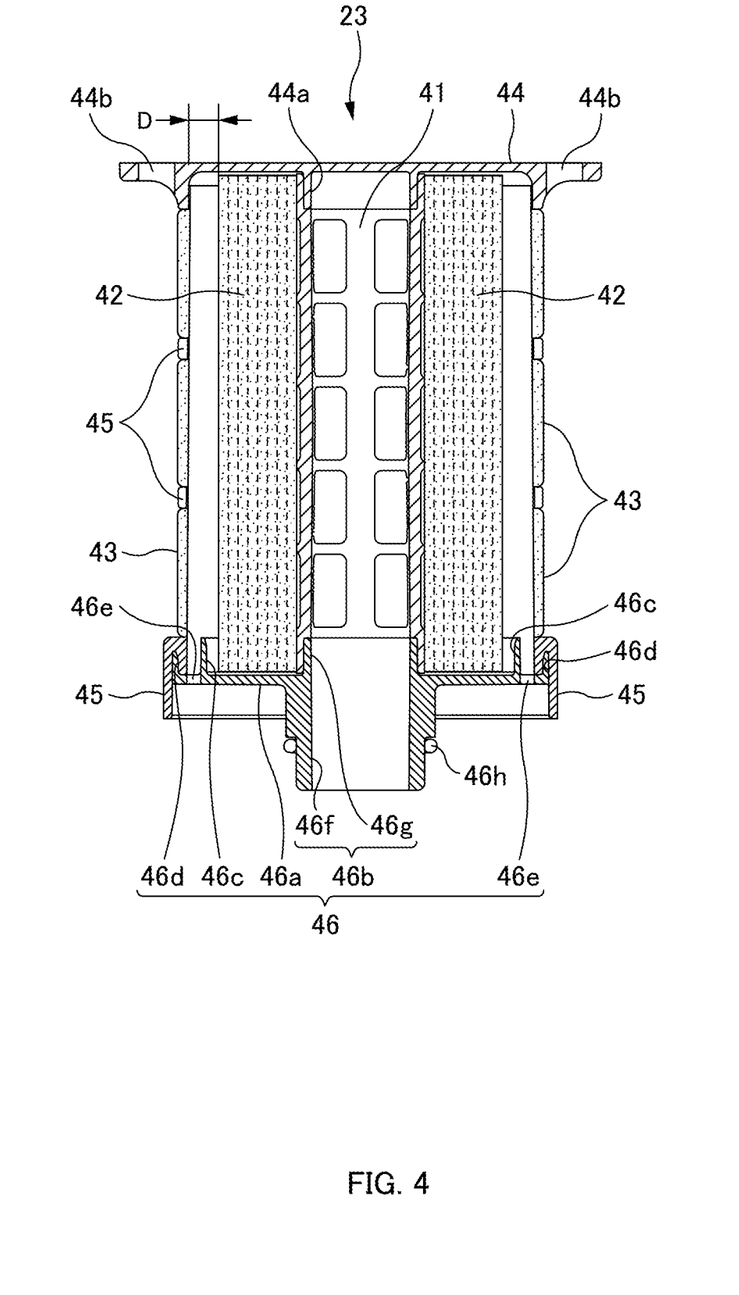
FIG. 4 is a vertical sectional view of a filter unit according to the first embodiment.

The filter unit 23 includes a support tube 41, a main filter 42, sub-filters 43, an upper blocking member 44, a support frame 45, and a lower blocking member 46, as illustrated in FIG. 4.

The support tube 41 is a member that acts as the core of the main filter 42 and is made by a lattice cylindrical member provided with numerous rectangular openings on the circumferential face in the present embodiment. The inner space of the support tube 41 is in communication with the inflow port 24 of the case 21 as illustrated in FIG. 3. Therefore, fuel gas vaporized by the vaporizer 12 flows into the inner space of the support tube 41.

The main filter 42 is, as illustrated in FIG. 4, a filter material for capturing the oil included in the fuel gas and separating the oil from the fuel gas, and corresponds to the first filter member. This main filter 42 is made by wrapping multiple times, for example, nonwoven fabric having an average pore size of 100 µm around the support tube 41 at the center. The main filter 42 of the present embodiment is made by wrapping the nonwoven fabric until the diameter reaches about 40 mm. The main filter 42 being made in this way by wrapping nonwoven fabric multiple times can widen the selection range of the average pore size of the nonwoven fabric and the number of times the nonwoven fabric is wrapped. In this manner, the mesh size and the oil retention volume of the main filter 42 can be easily adjusted.

The sub-filter 43 is a filter material for capturing oil that has dispersed from the main filter 42 and corresponds to the second filter member. This sub-filter 43 is manufactured by winding nonwoven fabric around the outer surface of the main filter 42 with a predetermined space from the outer surface of the main filter 42. The sub-filter 43 of the present embodiment is manufactured by winding nonwoven fabric with an average pore size of 1000 μm once around the support frame 45.

Figure 5:
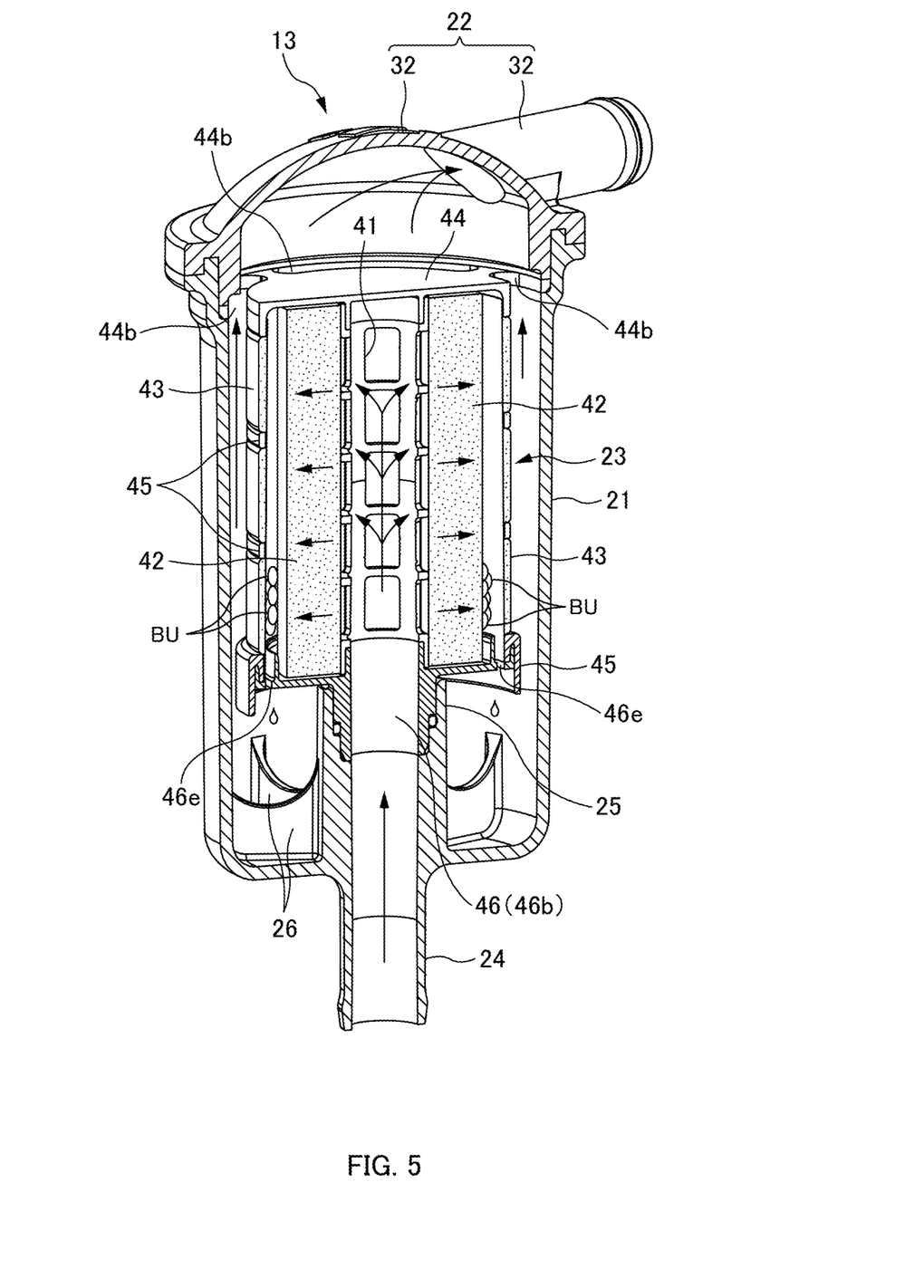
FIG. 5 is a perspective sectional view illustrating the flow of fuel gas.

Explanation of the functions of the sub-filter 43 will be given here. Although the details will follow later, when fuel gas continues to be treated by the fuel filter 13, the captured tar (oil) deposits inside the main filter 42 and reaches the outer surface of the main filter 42. As a result, a film made of tar is formed on the outer surface of the main filter 42. The high viscosity of tar allows the film to bulge by the fuel gas flowing through the main filter 42 to form foams EU, as illustrated in FIG. 5, and thereafter the foams EU rupture to generate mist. The tar that has changed into mist attempts to flow toward the downstream side together with the fuel gas, but is captured by the sub-filter 43. The sub-filter 43 being provided in this way can capture the tar on the outer surface of the main filter 42 even when the tar has been changed into mist.

The present embodiment here uses nonwoven fabric having a mesh size larger than the main filter 42. Therefore, tar in mist form can be captured by the sub-filter 43 without disturbing the flow of the fuel gas. As illustrated in FIG. 4, the present embodiment also has the distance D from the outer surface of the main filter 42 to the inner surface of the sub-filter 43 defined to be wider than the maximum height of the tar foam that is formed on the outer surface of the main filter 42. To be specific, this distance is defined to a value between approximately 3 mm and 10 mm. This makes it difficult for the foam BU to come into contact with the sub-filter 43 and thus can constrain problems of excess amount of tar adhering to the sub-filter 43.

The upper blocking member 44 is a member that blocks the space between the outer surface of the main filter 42 and the inner surface of the sub-filter 43 at the upper end parts of the filters 42, 43. The upper blocking member 44 of the present embodiment is made with a disk-like member. The center part on the lower face of the upper blocking member 44 is provided with a cylindrical rib 44a that fits together with the upper end part of the support tube 41. Further, the outer circumferential part of the upper blocking member 44 is provided with a plurality of air holes 44b along the outer circumference. These air holes 44b are provided for allowing fuel gas existing on the outer side of the circumference of the sub-filter 43 to flow into the side of the cap member 22. For such reason, these air holes 44b penetrate in the plate thickness direction at locations on the outer side of the circumference of the sub-filter 43.

The support frame 45 is a member for supporting the sub-filter 43 and is manufactured by forming a lattice structure into a cylindrical form. The support frame 45 of the present embodiment is provided integrally with the upper blocking member 44. In other words, the support frame 45 is provided facing downward at the lower side of the upper blocking member 44 and at a position at the inner circumferential side of the air holes 44b. The sub-filter 43 is fixed to the support frame 45 by adhesive and the like.

The lower blocking member 46 is a member that blocks the space between the outer surface of the main filter 42 and the inner surface of the sub-filter 43 at the lower ends of the filters 42, 43. This lower blocking member 46 includes a disk part 46a, a cylindrical fixing part 46b, an inner circumferential side rib 46c, and an outer circumferential side rib 46d.

The disk part 46a is a part for blocking the aforementioned space and is provided with a center hole at the center in the face direction for allowing the fuel gas to pass therethrough. In addition, discharge holes 46e are also provided to the part corresponding to the space for discharging the oil that has flowed down this space. There are four discharge holes 46e provided at an angular interval of 90 degrees in the circumferential direction in the present embodiment. The discharge holes 46e are in rectangular form penetrating the disk part 46a in the plate thickness direction. Note that the sizes of the discharge holes 46e are set to a minimal size that makes it difficult for tar to form a film.

The cylindrical fixing part 46b is an attachment part for mounting the filter unit 23 to the case 21 and also a support part for supporting the lower end part of the support tube 41.

In other words, a lower fixing cylinder part 46f in a cylindrical form is provided facing downward from the edge of the center hole of the disk part 46a. This lower fixing cylinder part 46f is a part that is inserted into the inner circumferential side of the seat part 25 of the case 21. The filter unit 23 is fixed to a predetermined position inside the case 21 by the lower fixing cylinder part 46f being inserted into the seat part 25. Note that an O-ring 46h is placed at the outer circumferential face of the lower fixing cylinder part 46f and thus restrains the fuel gas from leaking.

Additionally, an upper cylindrical fixing part 46g in a cylindrical form is provided facing upward from the edge of the center hole of the disk part 46a. The lower end part of the support tube 41 is inserted to the outer circumferential side of this upper cylindrical fixing part 46g. As a result, the lower end part of the support tube 41 is supported by the lower blocking member 46.

The inner circumferential side rib 46c is a circular rib in a planar view provided to the upper side surface of the disk part 46a so as to surround the lower end part of the main filter 42. The diameter of the inner circumferential side rib 46c is set to a size slightly larger than that of the main filter 42. Therefore, a small space is formed between the main filter 42 and the inner circumferential side rib 46c. The outer circumferential side rib 46d is a circular rib in a planar view provided above the outer circumferential edge of the disk part 46a. This outer circumferential side rib 46d is fit into the annular groove part provided to the lower end part of the support frame 45. The outer circumferential side rib 46d being fit into the groove allows the lower end part of the support frame 45 to be supported by the lower blocking member 46.

The fuel filter 13 structured in the above manner causes the fuel gas (shown by arrows in the figure) vaporized by the vaporizer 12 to flow through the inflow port 24 and into the interior of the case 21, as illustrated in FIG. 5. This fuel gas rises up through the inner space of the seat part 25 and the cylindrical fixing part 46b and is lead into the inner space of the support tube 41. Thereafter the fuel gas changes its direction in the support tube 41 to be diffused in the radial direction. Since the main filter 42 is provided adjacent to the support tube 41 in the radial direction, the tar included in the fuel gas is captured by the main filter 42. Meanwhile, the fuel gas from which tar has been separated flows from the main filter 42 through the sub-filter 43 to reach the space between the sub-filter 43 and the case 21. Thereafter this fuel gas rises along the inner wall surface of the case 21 and flows through the inner space of the cap member 22 to be fed to the injector 14.

Tar deposits on the main filter 42 when the fuel gas treatment continues. The tar would reach the outer surface of the main filter 42 when the amount of deposited tar increases. A film will be formed on the outer surface due to the viscosity of the tar being high. Then the tar film will bulge due to the flowing fuel gas to form foams BU. The foams BU of the tar would rupture thereafter forming mist, but this mist will be captured by the sub-filter 43. Therefore, the fuel gas that has passed through the sub-filter 43 would be in a clean state with the oil mist removed. This clean fuel gas is discharged from the fuel filter 13 through the discharge port 32.

Consequently, the fuel filter 13 of the present embodiment can dramatically improve the removal rate of the tar included in the fuel gas. Note that the tar that has reached the outer surface of the main filter 42 and the tar captured by the sub-filter 43 would flow down by its own weight with increase in the deposited volume and then drip from the discharge hole 46e provided to the lower blocking member 46. The dripped tar is stored at the bottom end part of the inner space of the case 21.

As is obvious from the above description, the sub-filter 43 encircles the outer circumferential side of the main filter 42 with a space therebetween. Therefore, the fuel filter 13 of the present embodiment can capture the tar with the sub-filter 43 even when the foam of the tar is generated on the outer surface of the main filter 42 and the tar changes into a mist state due to rupture of the foam. As a result, the removal rate of the tar included in the fuel gas can be dramatically improved compared to conventional devices.

Further, the discharge hole 46e is provided to the lower blocking member 46 through which the tar that has flowed down through the space between the main filter 42 and the sub-filter 43 is discharged outside from the filter unit 23. Therefore, problems of the tar building up in the space can be avoided.

In addition, since the main filter 42 is manufactured by wrapping nonwoven fabric around the support tube 41 multiple times, it is easy to adjust the retention volume of the tar and the ease in passing of the fuel gas by selecting the pore size of the nonwoven fabric and the strength by which the nonwoven fabric is wound.

Further, since the sub-filter 43 is manufactured by wrapping thin nonwoven fabric having a mesh size (pore size) larger than that of the main filter 42 once around the main filter, the tar in a mist state can be captured while air permeability of the fuel gas is maintained.

In the following, description will be given of a second embodiment in which the oil separator according to the present invention has been applied to a closed crankcase ventilation system (hereinafter, ventilation system).

Figure 6:
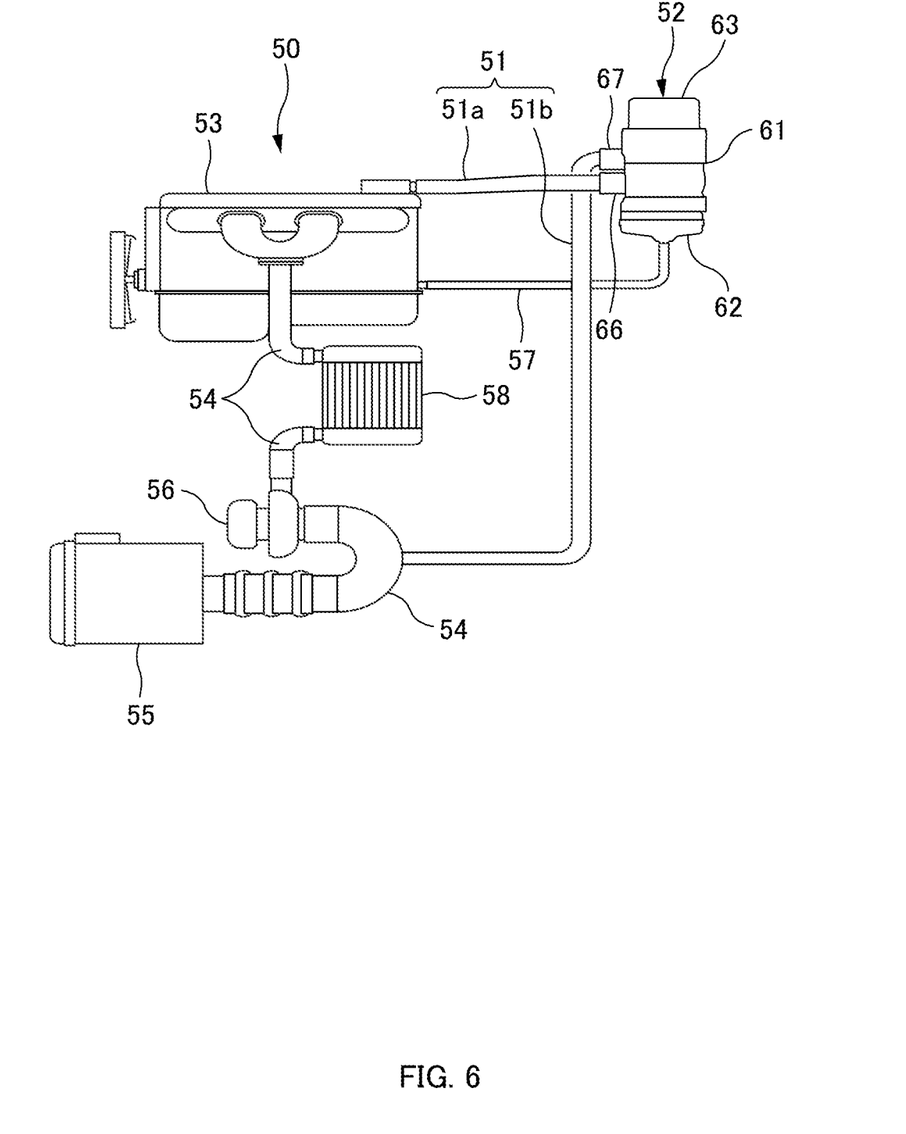
FIG. 6 is a diagram illustrating a second embodiment in which the oil separator according to the present invention has been applied to a closed crankcase ventilation system.

As illustrated in FIG. 6, the ventilation system 50 includes a breather pipe 51 and a ventilator 52. The breather pipe 51 sections the channel for restoring blow-by gas (gas including oil) discharged from the crankcase of an engine 53 back to an intake side channel 54 that is in communication with the engine 53. The breather pipe 51 of the present embodiment restores blow-by gas back to the part of the intake side channel 54 that connects an air filter 55 and a turbo charger 56. The ventilator 52 is located along the breather pipe 51 and separates oil from the blow-by gas for returning the oil back to the engine 53.

In the ventilation system 50, the blow-by gas discharged from the engine 53 flows into the ventilator 52 through an upstream side breather pipe 51a. Then the oil that has been separated by the ventilator 52 is returned to the engine 53 through an oil recovery pipe 57. Meanwhile the blow-by gas from which oil has been removed by the ventilator 52 is returned to the intake side channel 54 through a downstream side breather pipe 51b. The returned blow-by gas is then mixed with fresh air provided from the air filter 55 and is compressed by the turbo charger 56. Thereafter, the compressed mixture is cooled by a charge cooler 58 to be fed to the engine 53. Thus the blow-by gas from which oil has been removed can be fed to the engine 53.

Figure 7:
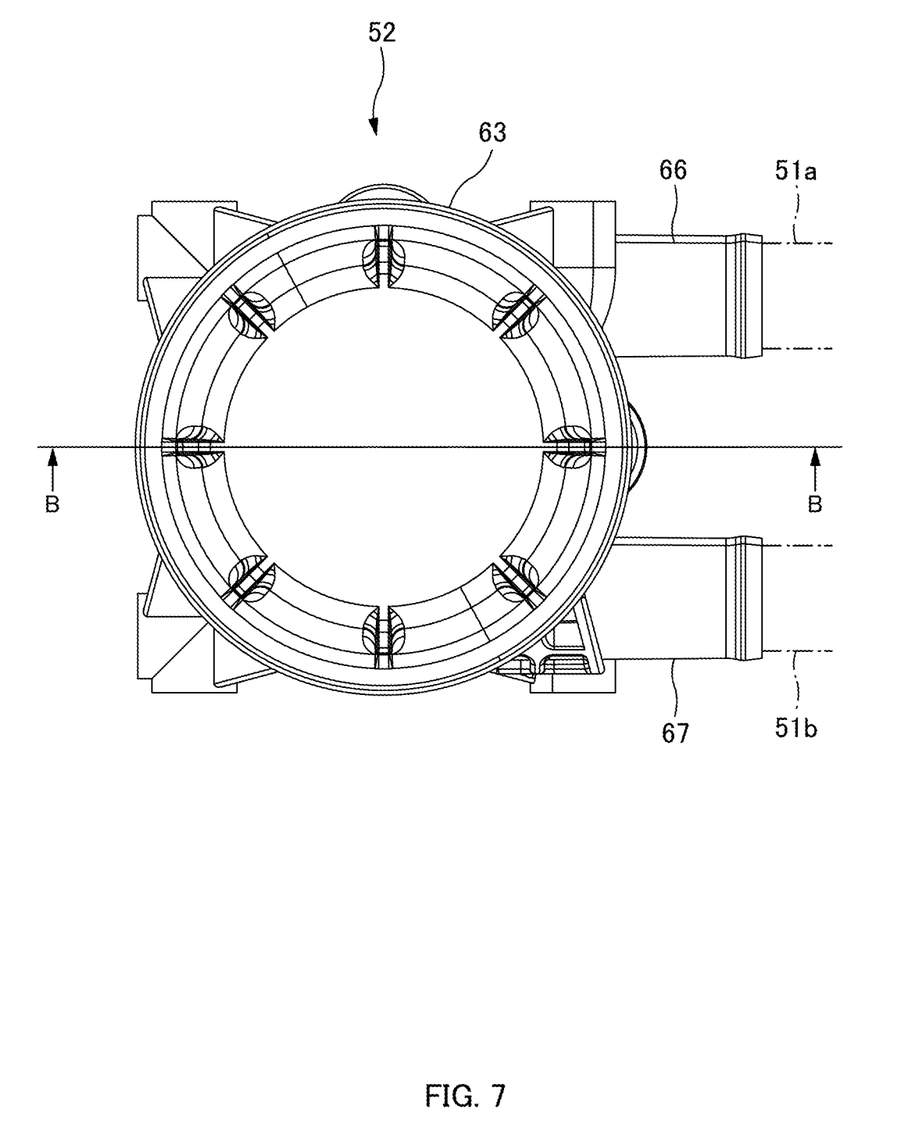
FIG. 7 is a planar view of a ventilator according to the second embodiment.
Figure 8:
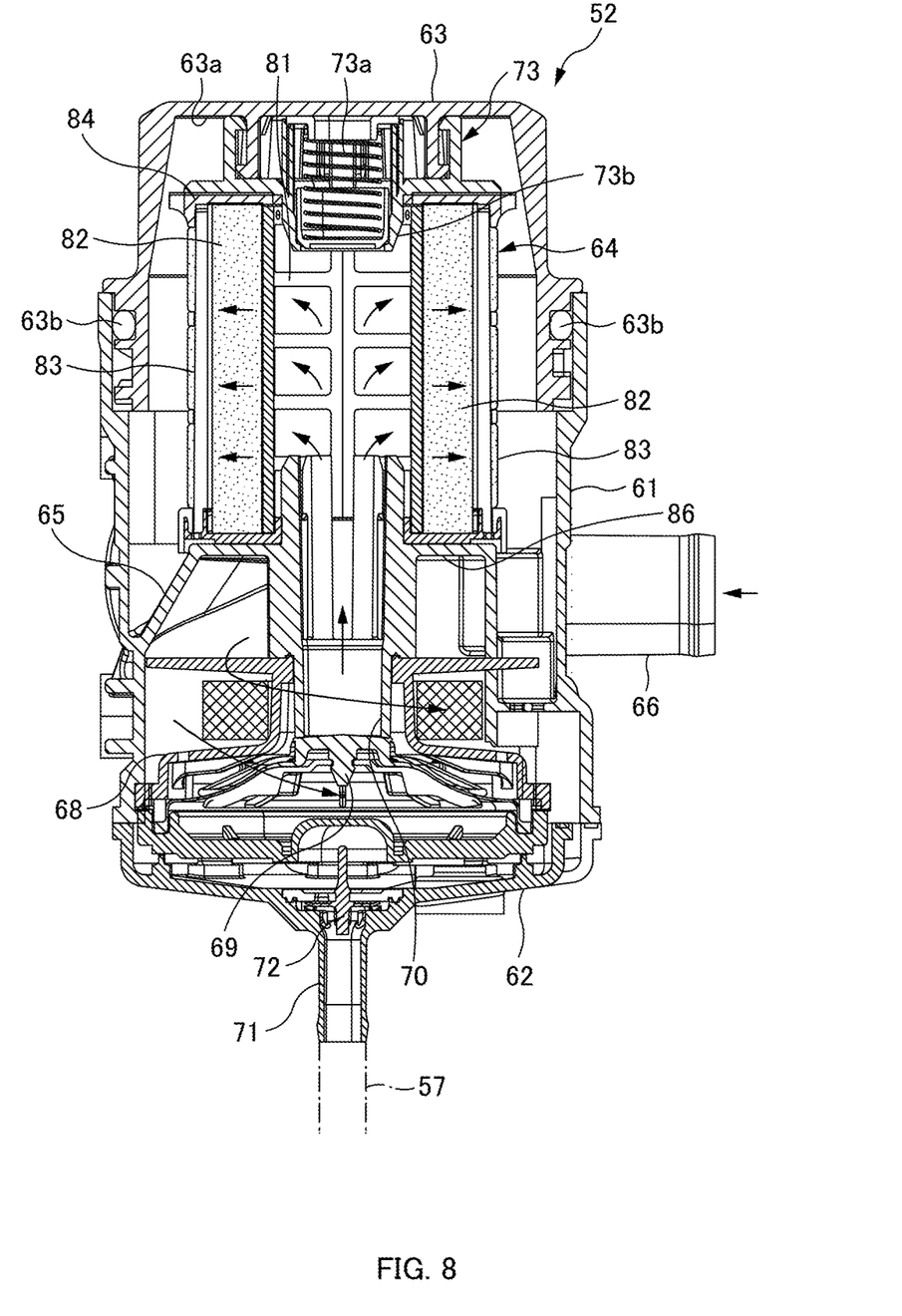
FIG. 8 is a sectional view taken along line B-B of FIG. 7.

Description of the ventilator 52 will be given next. FIG. 7 is a planar view of the ventilator 52 and FIG. 8 is a sectional view taken along line B-B of FIG. 7. As illustrated in FIG. 8, the ventilator 52 of the present embodiment includes a case 61, a drain unit 62, a cap member 63 and a filter unit 64.

The case 61 is a cylindrical member whose top is open. A loading unit 65 on which the filter unit 64 is loaded is provided inside the case 61 at the middle part in the height direction thereof. As illustrated in FIGS. 7 and 8, an inflow port 66 and a discharge port 67 are provided, to the side face of the case 61, facing the lateral direction. The inflow port 66 and the discharge port 67 are made with cylindrical members and the upstream side breather pipe 51a is connected to the inflow port 66 and the downstream side breather pipe 51b is connected to the discharge port 67.

As illustrated in FIG. 8, a channel sectioning member 68 is positioned under the loading unit 65 and sections the encircling channel that circulates as well as guides the blow-by gas. A positive crankcase ventilation (PCV) valve 69 that allows the inflow of the blow-by gas is positioned at the bottom end of this encircling channel. The PCV valve 69 is provided to relieve the effects due to the fluctuations of the induction manifold depression of the engine 53. The bottom end of a communication cylinder unit 70 is positioned at the center part of the PCV valve 69 in the plane direction thereof.

This communication cylinder unit 70 is a cylindrical part that sections the communication channel that communicates with the filter unit 64 and penetrates through the channel sectioning member 68, and the upper end portion of the communication cylinder unit 70 protrudes upward above the loading unit 65. This protruding portion is inserted into a support tube 81 of the filter unit 64 from the bottom side. Thus the protruding portion also functions as a positioning member for the filter unit 64.

The drain unit 62 is a part for discharging oil separated from the blow-by gas to the outside of the ventilator 52 and is connected to the bottom end of the case 61 from the lower side. The drain unit 62 is formed in a funnel shape and the narrowed part thereof configures a drain port 71. Meanwhile, a check valve 72 is provided right above the drain port 71.

The oil recovery pipe 57 is connected to the drain port 71. This configuration allows the oil stored in the drain unit 62 to flow into the oil recovery pipe 57 when the check valve 72 is opened. The oil is then returned to the engine 53 through the oil recovery pipe 57.

The cap member 63 is a cylindrical member having an open bottom end and a top end closed with a ceiling part 63a. This cap member 63 sections the storage space of the filter unit 64 together with the upper half of the case 61. For this purpose, the lower end of the outer surface of the cap member 63 is provided with an external thread and has an O-ring 63b mounted thereto. On the other hand, the upper end of the inner surface of the case 61 is provided with an internal thread. The cap member 63 being screwed in allows the upper end part of the case 61 and the bottom end of the cap member 63 to fit together and the clearance between the members is closed with the O-ring 63b.

The underside of the ceiling part 63a of the cap member 63 is provided with a filter holder 73. This filter holder 73 is a member that supports the filter unit 64 from above and is a disk member to which a pushing force is applied in the downward direction by a spring 73a. A positioning protrusion 73b is provided facing downward at the center of the filter holder 73 in the face direction thereof. This positioning protrusion 73b is a part that is inserted into the support tube 81 of the filter unit 64 from above and fixes the filter unit 64 to the predetermined position.

The filter unit 64 is a part that removes the oil included in the blow-by gas and is accommodated in the accommodation space formed by the case 61 and the cap member 63 as illustrated in FIG. 8. This filter unit 64 is also structured in a similar manner to the filter unit 64 of the first embodiment. In other words, the filter unit 64 includes a support tube 81, a main filter 82, sub-filters 83, an upper blocking member 84, a support frame 85, and a lower blocking member 86, as illustrated in FIG. 9.

Figure 9:
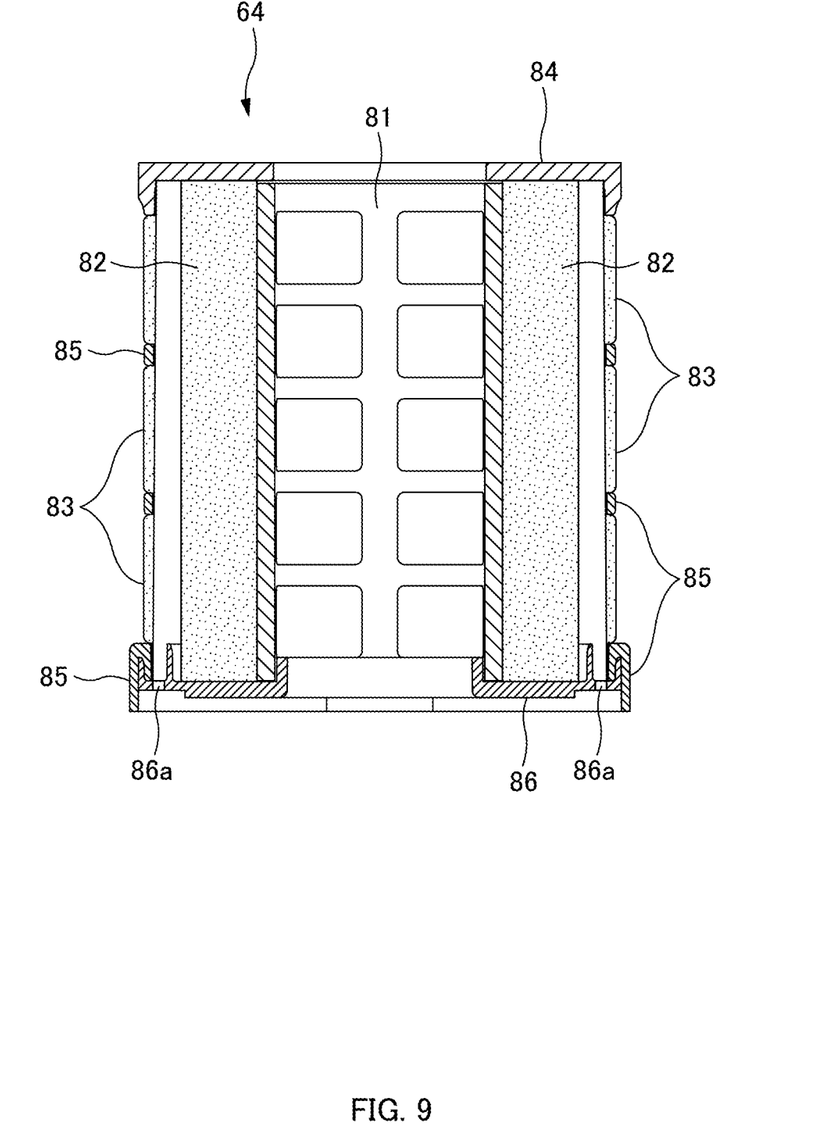
FIG. 9 is a vertical sectional view of a filter unit according to the second embodiment.

Regarding the aforementioned parts, although there are some differences in having or not having a cylindrical fixing part 46b and the sizes of the details, they can be regarded to have the same structure in general, as can be understood by comparing FIG. 9 and FIG. 5.

Briefly, the support tube 81 is a member that acts as the core of the main filter 82. The main filter 82 is a filter material for capturing the oil included in the fuel gas and separating the oil from the fuel gas, and is manufactured by wrapping nonwoven fabric around the support tube 81 multiple times. The sub-filter 83 is a filter material for capturing oil that has dispersed from the main filter 82 and is manufactured by winding nonwoven fabric along the outer surface of the main filter 82 with a predetermined space from the outer surface of the main filter 82. The upper blocking member 84 is a member that blocks the space between the outer surface of the main filter 82 and the inner surface of the sub-filter 83 at the top of the filters 82, 83. The lower blocking member 86 is a member that blocks the space between the outer surface of the main filter 82 and the inner surface of the sub-filter 83 at the bottom of the filters 82, 83. A discharge hole 86a for discharging oil that has flowed down the aforementioned space is also provided to the lower blocking member 86.

In the ventilator 52 structured in the above manner, as illustrated in FIG. 8, the blow-by gas that has flowed in from the inflow port 66 flows downward while circulating along the encircling channel. When the blow-by gas reaches the PCV valve 69, the gas rises up the interior space of the communication cylinder unit 70 and then reaches the support tube 81. Since the main filter 82 is provided in the radial direction of the support tube 81, the blow-by gas passes through the inside of the main filter 82. At that time, the oil included in the blow-by gas is captured by the main filter 82. The blow-by gas from which oil has been separated passes through the sub-filter 83 to be discharged from the discharge port 67 thereafter.

As the treatment of the blow-by gas continues in also this ventilator 52, the oil deposits in the main filter 82. The oil would reach the outer surface of the main filter 82 as the deposited amount of oil increases. Although the oil in foam form ruptures and changes into mist due to the flow of the blow-by gas, this mist is captured by the sub-filter 83. Therefore, the removal rate of the oil included in the blow-by gas can be dramatically improved.

Then the oil that has reached the outer surface of the main filter 82 and the oil that has been captured by the sub-filter 83 are allowed to drip from the discharge hole 86a provided to the lower blocking member 86. The dripped oil is stored in the drain unit 62. Similarly, the oil that has been separated from the blow-by gas at the encircling channel and the interior space of the communication cylinder unit 70 is stored in the drain unit 62. Thereafter the oil is discharged from the ventilator 52 with the movement of the check valve 72.

The above description of the embodiments is merely for facilitating the understanding of the present invention and is not to be interpreted as limiting the present invention. The present invention can be altered and improved without departing from the gist thereof, and equivalents thereof are intended to be embraced therein. For example, modified configurations shown below are possible.

LPG in the first embodiment and the blow-by gas in the second embodiment have been exemplified as the target gas that is to be treated. However, the target gas is not limited to such examples. For example, compressed natural gas (CNG) may be used. Basically, any gas can be employed in the present invention as long as the gas includes oil as an impurity or liquid of high viscosity similar to oil.

Nonwoven fabric wrapped around the support tubes 41, 81 multiple times has been exemplified with regard to the main filters 42, 82 in the above embodiments; however, the configuration is not limited to this. For example, a filter material made by hardening glass fiber into a cylindrical form may be used or a filter material made with a sponge may be used.

Nonwoven fabric has been exemplified with regard to the sub-filters 43, 83 in the above embodiments; however, the configuration is not limited to this. For example, a filter material made with a finely meshed metal or a filter material made with a thin sponge may be used. Basically, any filter material can be used as the sub-filters 43, 83 as long as the filter material can capture the oil generated in mist form on the outer surface of the main filters 42, 82, and has air permeability.

In the aforementioned embodiments, the support tubes 41, 81 in cylindrical forms have been exemplified; however, the shape is not limited to cylindrical ones. For example, a lattice member formed in an ellipse form can be used as the support tubes.

In the aforementioned embodiments, both the fuel filter 13 and the ventilator 52 have the central axes of the main filters 42, 82 directed in the vertical direction; however, the central axes need not be directed in the vertical direction. Operational advantages same as those of the aforementioned embodiments can be obtained even when the support tubes 41, 81 are inclined at approximately 45 degrees from the vertical direction. In other words, it will do as long as the central axes are positioned in the up-down direction (within 45 degrees from the vertical direction) with regard to the main filters 42, 82 as the first filter member.

10 . . . fuel supply device, 11 . . . fuel tank, 12 . . . vaporizer, 13 . . . fuel filter, 14 . . . injector, 15 . . . gas engine, 16 . . . piping, 21 . . . case, 22 . . . cap member, 23 . . . filter unit, 24 . . . inflow port, 25 . . . seat part, 26 . . . partitioning wall, 31 . . . main body part, 32 . . . discharge port, 41 . . . support tube of filter unit, 42 . . . main filter, 43 . . . sub-filter, 44 . . . upper blocking member, 44a . . . cylindrical rib, 44b . . . air hole, 45 . . . support frame, 46 . . . lower blocking member, 46a . . . disk part, 46b . . . cylindrical fixing part, 46c . . . inner circumferential side rib, 46d . . . outer circumferential side rib, 46e . . . discharge hole, 50 . . . ventilation system, 51 . . . breather pipe, 52 . . . ventilator, 53 . . . engine, 54 . . . intake side channel, 55 . . . air filter, 56 . . . turbo charger, 57 . . . oil recovery pipe, 58 . . . charge cooler, 61 . . . case, 62 . . . drain unit, 63 . . . cap member, 63a . . . ceiling part, 63b . . . O-ring, 64 . . . filter unit, 65 . . . loading unit, 66 . . . inflow port, 67 . . . discharge port, 68 . . . channel sectioning member, 69 . . . PCV valve, 70 . . . communication cylinder unit, 71 . . . drain port, 72 . . . check valve, 73 . . . filter holder, 73*a* . . . spring, 73*b* . . . positioning protrusion, 81 . . . support tube of filter unit, 82 . . . main filter, 83 . . . sub-filter, 84 . . . upper blocking member, 85 . . . support frame, 86 . . . lower blocking member, 86*a* . . . discharge hole, BU . . . tar foam, D . . . distance from outer surface of main filter to inner surface of sub-filter

The invention claimed is:

1. A method to separate oil from a target gas including the oil as an impurity, comprising:

providing a first filter member made with a cylindrical filter material in a cylindrical shape having an air permeability, and arranged such that the target gas flows in from a hollow part inside said first filter member and a central axis is in an up-down direction; and providing a second filter member made with a filter material having an air permeability and having a mesh size larger than that of the first filter member, and wrapped around the first filter member along an outer surface thereof with a predetermined spacing from the outer surface of the first filter member, capturing, by said second filter member mist formed by ruptured foams of oil captured by said first filter member, said foams being formed by said target gas flowing through said first filter member making a film outside said first filter member to bulge, said film being formed by oil captured by said first filter member.

2. The method to separate oil from a target gas according to claim 1, comprising:

setting the predetermined spacing wider than a maximum height of a foam of the oil formed on the outer surface of the first filter member by a flow of the target gas.

3. The method to separate oil from a target gas according to claim 1 or 2, wherein the second filter member is made of a nonwoven fabric.

4. The method to separate oil from a target gas according to claim 1 or 2, wherein the first filter member is manufactured by wrapping a nonwoven fabric around a support tube a plurality of times.

5. The method to separate oil from a target gas according to claim 1 or 2, comprising:

providing an upper blocking member that blocks a space between the outer surface of the first filter member and an inner surface of the second filter member at top parts of the filter members; and providing a lower blocking member including a circular rib having a diameter larger than that of said first filter member provided on the upper surface thereof that blocks the space at bottom parts of the filter members so that a gap is formed between said first filter member and said circular rib and is provided with a discharge hole for discharging the oil that has flowed down the space.

* * * * *